United States Patent [19]

Oomen et al.

[11] Patent Number: 4,980,236
[45] Date of Patent: Dec. 25, 1990

[54] COMPOSITE BODY

[75] Inventors: Joris J. C. Oomen; Jan W. Rouwendal, both of Eindhoven, Netherlands

[73] Assignee: U.S. Philips Corporation, New York, N.Y.

[21] Appl. No.: 23,589

[22] Filed: Mar. 9, 1987

[30] Foreign Application Priority Data

Mar. 11, 1980 [NL] Netherlands .................. 8600624

[51] Int. Cl.$^5$ .................. B32B 15/04; C03C 8/20; C03C 8/24
[52] U.S. Cl. .................. 428/469; 428/471; 428/472; 428/689; 428/701; 428/702; 156/89; 501/15; 501/17; 501/18; 501/21; 501/105; 501/125; 313/623; 313/625
[58] Field of Search ............... 428/469, 471, 457, 688, 428/689, 699, 701, 702, 472; 313/623, 625; 501/15, 17, 18, 21, 105, 125; 156/89

[56] References Cited

U.S. PATENT DOCUMENTS

| | | | |
|---|---|---|---|
| 3,588,573 | 6/1971 | Chen et al. | 313/623 |
| 3,837,870 | 9/1974 | Recasens et al. | 501/105 |
| 4,006,028 | 2/1977 | Nofziger | 501/49 |
| 4,208,605 | 6/1980 | McVey et al. | 501/52 |
| 4,367,110 | 1/1983 | Yoshikawa | 156/89 |
| 4,396,724 | 8/1983 | Burden | 501/105 |
| 4,501,799 | 2/1985 | Driessen et al. | 428/469 |
| 4,533,647 | 8/1985 | Tien | 501/105 |
| 4,552,852 | 11/1985 | Manning | 501/105 |
| 4,621,066 | 11/1986 | Nishigaki et al. | 501/125 |
| 4,665,040 | 5/1987 | Kurita et al. | 501/105 |

FOREIGN PATENT DOCUMENTS 1010081 1/1986 Japan ...................... 501/21

Primary Examiner—Paul J. Thibodeau
Assistant Examiner—Christopher Brown
Attorney, Agent, or Firm—John C. Fox

[57] ABSTRACT

The invention relates to a composite body comprising a first part of ceramic material, a second part of metallic material, of ceramic material or of a mixture of metallic and ceramic material, and a third part of a melting ceramic which seals together the first and second parts, and comprises a frit of $Al_2O_3$ and either one or more alkaline earth metal oxides or one or more rare earth metal oxides or a combination of these two oxides. According to the invention, the melting ceramic contains a filler material which occupies at least 20% and at most 50% of the volume of the melting ceramic.

3 Claims, 1 Drawing Sheet

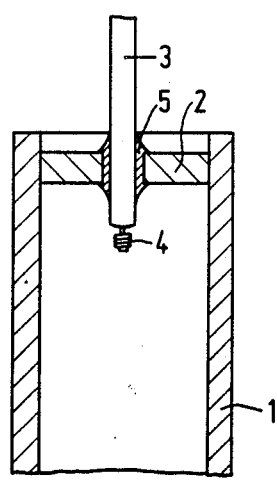

COMPOSITE BODY

BACKGROUND OF THE INVENTION

The invention relates to a composite body comprising a first part of ceramic material, to a second part of metallic material, of ceramic material or of a mixture of metallic and ceramic material, and a third part of a melting ceramic which seals together the first and second parts, and comprises a frit of $Al_2O_3$ and either one or more alkaline earth metal oxides or one or more rare earth metal oxides or a combination of these two oxides.

The term "ceramic material" is to be understood to mean in this description and the appended claims a material of crystalline oxidic substance which contains at least alumina. This may be, for example, monocrystalline sapphire. Another possibility is easily sintered polycrystalline alumina or yttrium aluminate garnet.

These materials, which are suitable to be used as a wall material for discharge vessels of high-pressure discharge lamps, can be heated for a long time at temperatures up to about 1300° C. and have at such high temperatures a high resistance to attack by alkali metals and halides. Heating for a long time above 1300° C. generally leads to a considerable evaporation of the relevant materials. Heating for a short time to 1750° C. to 1800° C. is possible, however, without unfavourable consequences. However, heating above 1750° C. to 1800° C., even for a short time, leads to the aforementioned evaporation to a very great extent and even to spontaneous formation of ruptures.

The term "rare earth metal oxides" is meant include the following oxides: $Sc_2O_3$, $Y_2O_3$, $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$.

A "melting ceramic" means in this description and the appended claims a sealing material having a lower softening temperature than the parts of the composite body to be sealed, which may be present in the virteous phase and in the crystalline phase as well as in a combination of these two phases.

A composite body of the kind mentioned in the opening paragraph is known from European Patent Application No. 0060582 A1 (PUN 9968 EU). Such a composite body may be a high-pressure discharge lamp provided with a discharge vessel having a wall of ceramic material, through which a current lead-through member is passed, which is sealed thereto in a gas-tight manner by means of the melting ceramic. Frequently used high-pressure discharge lamps are high-pressure sodium lamps and high-pressure metal halide lamps. In lamps of both types, in the operating condition the wall of the discharge vessel is subjected to a high temperature and the filling of the discharge vessel is ionized in part. The melting ceramic used in such lamps therefore should be resistant to attack by sodium and metal halides at high temperatures.

The gas-tight seal, which provides a high resistance to attack by sodium and halides, can be obtained by means of the known meltin ceramic. In general a gas-tight seal is obtained by a finely crystalline melting ceramic. It should be noted that in general the thermal coefficients of expansion of the sealed parts are different so that stresses can occur in the melting ceramic. In case of a finely crystalline material, the possibility of crack formation is smaller than in case of coarsely crystalline melting ceramic. The term "crystalline" is to be understood herein to mean that 80% of the crystals have dimensions of 10 μm or more. A melting ceramic is considered to be finely crystalline when the dimensions of 80% of its crystals lie between 1 and 5 μm.

A further advantage of a finely crystalline melting ceramic is that during sealing the possibility of occlusions and micro-cracks is considerably smaller than in the case of coarsely crystalline melting ceramic.

It has been found that the known melting ceramic, although it is finely crystalline for the major part, nevertheless under given circumstances forms large crystals (>20 μm) and moreover can comprise bubble-shaped cavities. The bubble-shaped cavities ("bubbles") are due to gas desorption during the processing of the melting ceramic. The presence of large crystals is in practice always associated with micro-cavities. Micro-cavities and bubbles are detrimental to the strength and resistance of the melting ceramic.

Another problem arising in practice is that during the sealing-in process $\beta$ aluminate crystal structures can be formed. The probability of $\beta$ aluminate crystal structures being formed is found to increase considerably at higher values of the maximum temperature during the sealing-in process.

$\beta$ aluminate crystal structures are very sensitive to attack by especially by sodium and are therefore very undesirable in a lamp having as a filling constituent sodium or sodium halide.

The invention has for its object to provide a means by which the seal between the parts of the composite body remains substantially free from both large crystals and $\beta$ aluminate crystal structures whilst maintaining the favourable properties of the melting ceramic.

SUMMARY OF THE INVENTION

According to the invention, a composite body of the kind mentioned in the opening paragraph is for this purpose characterized in that the melting ceramic contains a filler material which is distributed over its volume and occupies at least 20% and at most 50% of the volume of the melting ceramic.

The term "filler material" is to be understood to mean in this description and the appended claims a constituent of the melting ceramic which is present as a separate phase between the remaining phases of the melting ceramic. The filler material is preferably substantially homogeneously distributed over the volume of the melting ceramic. The average particle size of the filler material can be chosen in a wide range slightly dependent upon the dimensions of the space available for the melting ceramic. The size of the particles of the filler material is preferably chosen so that at least 80% are smaller than 10 μm in the case of dimensions of the available space between 10 μm and 100 μm. Moreover, the size distribution is chosen so that the specific surface area of the filler material is smaller than 60 m²/cm³ on the basis of the theoretical density.

It has been found that the occurrence of large crystals and bubbles in the ceramic material is substantially avoided when the melting ceramic is provided with filler material It is moreover of advantage that the softening temperature remains below 1750° C. It further appears that the possibility of the formation of $\beta$ aluminate crystal structures is considerably reduced.

It has been found that with a content of the filler material smaller than 20% by volume the formation of gas desorption bubbles and micro-cavities is not counteracted to an acceptable extent. The possibility of formation of β aluminate crystal structures also remains substantially unchanged in these conditions.

The filler material also influences the viscosity of the melting ceramic and hence the transport of the melting ceramic in the space to, be filled between the two parts of the composite body to be sealed together. With a percentage of filler material of at most 50% by volume, it appears that under widely different circumstances a good transport of the melting ceramic containing filler material is guaranteed. Higher degrees of filling lead to hindrance to the transport of the melting ceramic, which may result in thixotropic effects, such as demixing of melting ceramic and filler material.

The use of a material as an addition in a melting ceramic is known from German Offenlegungsschrift No. 2,032,277. In this case, the addition is being dissolved in the melting ceramic instructions for determining the required quantity of addition cannot be derived from the Offenlegungsschrift. Moreover, a new melting ceramic is obtained having its own specific properties with respect to crystallization, resistance to metal vapours, adhesion, etc.

Preferably, in a composite body according to the invention, the filler material in the melting ceramic consists of one or more of the following metal oxides:
  alumina,
  zirconium oxide,
  hafnium oxide,
  thorium oxide,
  uranium oxide.
These metal oxides have in a wide range of filling percentages no or substantially no tendency to be dissolved in the melting ceramic and only lead to a small increase of the softening temperature of the melting ceramic.

More particularly, a composite body is to be preferred in which the filler material in the melting ceramic consists of $HfO_2$, which is present in the amount of 20% to 40% by volume

BRIEF DESCRIPTION OF THE DRAWING

The drawing is a section view of an end portion of a discharge vessel for a high pressure sodium lamp showing a composite body of the invention.

DESCRIPTION OF THE PREFERRED EMBODIMENTS

Embodiments of composite bodies according to the invention will be described more fully with reference to the drawing.

The drawing shows an end portion of the discharge vessel of a high-pressure sodium lamp. The lamp is known from, for example, U.S. Pat. No. 3,716,743 and its operation will not be described herein. The lamp portion shown is a composite body comprising a first part consisting of a tube 1 and a disk 2, both of densely sintered polyerystalline alumina (PCA ). A second part consisting of a hollow niobium sleeve 3 is sealed in a gas-tight manner into the disk 2 by means of a melting ceramic 5 according to the invention. An electrode 4 consisting of a tungsten pin provided with a tungsten helix is secured by means of titanium solder in the sleeve 3.

EXAMPLES

A large number of discharge vessels for high-pressure sodium lamps of the kind shown in the drawing are provided with a gas-tight seal connection between the Nb sleeve and the PCA dk with the use of a melting ceramic provided with a filler material. For a good relative comparison, discharge vessels of equal dimensions are used. The most important dimensions are:

| | |
|---|---|
| inner diameter of tube 1 | 5.1 mm |
| inner diameter of disk 2 | 2.08 mm |
| outer diameter of sleeve 3 | 2 mm |
| height of disk 2 | 3 mm |

A first group of seals is obtained with the use of a melting ceramic which, apart from filler material, comprises a frit of $Al_2O_3$ and mainly alkaline earth metal oxides, according to the composition expressed in mol. %:

| | |
|---|---|
| $Al_2O_3$ | 32.9 |
| MgO | 10.3 |
| CaO | 50.8 |
| BaO | 4.2 |
| $B_2O_3$ | 1.8 |

The melting ceramic is obtained as follows: a mixture of the aforementioned constitutive oxides each having a purity of at least 99.9% is fused in a high-frequency furnace to a vitreous mass or to a vitreous mass with small crystals. After cooling, this mass is pulverized to form a frit then a filler material in the form of crystalline grains is added to the frit powder thus obtained. After care mixing, powder compacts in the shape of rings of melting ceramic are formed therefrom by pressing. The melting ceramic thus formed proves to contain a small quantity of water varying from 0.04 mol. % to 0.12 mol. %.

Table I indicates of a number of examples by serial number in which the kind and quantity of filler material used and the maximum temperature during the sealing-in process $T_{max}$ are stated. Of the filler material grains added, about 85% was smaller than 10 μm, while the specific surface area was 25 $m^2/cm^3$ for $Al_2O_3$, 58 $m^2/cm^3$ for HfO and 39 $m^2/cm^3$ for $ZrO_2$.

TABLE I

| serial nr. | filler material | quantity filler material % by volume | $T_{max}$ in °C. |
|---|---|---|---|
| 1 | $Al_2O_3$ | 30 | 1500 |
| 2 | $Al_2O_3$ | 40 | 1500 |
| 3 | $ZrO_2$ | 20 | 1450 |
| 4 | $ZrO_2$ | 30 | 1500 |
| 5 | $ZrO_2$ | 40 | 1500 |
| 6 | $HfO_2$ | 20 | 1400 |
| 7 | $HfO_2$ | 30 | 1450 |
| 8 | $HfO_2$ | 40 | 1550 |

The seal is obtained in a sealing-in process carried out in the following manner. The parts to be sealed are first joined in the desired position and at the seal area with a ring of the melting ceramic chosen. This assembly is heated in a furnace from room temperature to $T_{max}$, which temperature lies between 1250° C. and 1550° C., at a rate of about 10° C./s, is held for at most 150 seconds at $T_{max}$ and is then cooled by at least 10° C./s to about 1100° C. This temperature of 1100° C. is maintained for at least 110 seconds and for at most 250 seconds , whereupon the temperature is reduced to room temperature at a rate of about 5° C./s.

A second group of examples is obtained by means of a melting ceramic having a frit composition on the basis of $Al_2O_3$, alkaline earth metal oxide and rare earth metal oxide. The composition in mol. % of the starting ceramic then is

| | |
|---|---|
| Al$_2$O$_3$ | 35.8 |
| CaO | 55.4 |
| SrO | 7.0 |
| Y$_2$O$_3$ | 1.8 |

The melting ceramic containing a filler material is obtained in the same manner as described for the first group of examples. For the second group of examples, Table II indicates data about filler material and maximum temperature during the sealing-in process T$_{max}$. In addition to the filler materials Al$_2$O$_3$, HfO$_2$ and ZrO$_2$ used in the first group of examples. ThO$_2$ is used as filler material, of which 84% of the grains are smaller than 5 μm and the specific surface area was 28 m$^2$/cm$^3$.

TABLE II

| serial nr. | filler material | quantity filler material in % by volume | T$_{max}$ in °C. |
|---|---|---|---|
| 9 | Al$_2$O$_3$ | 20 | 1450 |
| 10 | Al$_2$O$_3$ | 30 | 1500 |
| 11 | ZrO$_2$ | 30 | 1550 |
| 12 | HfO$_2$ | 20 | 1550 |
| 13 | HfO$_2$ | 30 | 1600 |
| 14 | HfO$_2$ | 40 | 1600 |
| 15 | HfO$_2$ | 50 | 1675 |
| 16 | ThO$_2$ | 20 | 1500 |
| 17 | ThO$_2$ | 30 | 1550 |
| 18 | ThO$_2$ | 40 | 1650 |

The sealing-in process is analogous to the sealing-in process of the first group of examples, but the range of T$_{max}$ now extends to about 1700° C.

As a third group of examples, discharge vessels are formed by means of a melting ceramic whose frit comprises A$_2$O$_3$ and rare earth metal oxides having the composition in mol. % is:

| | |
|---|---|
| Al$_2$O$_3$ | 65.0 |
| Sc$_2$O$_3$ | 19.25 |
| Y$_2$O$_3$ | 5.25 |
| La$_2$O$_3$ | 10.5 |

The method of preparing the melting ceramic containing filler material is analogous to the method of preparation used in the first group of examples. The sealing-in process for this third group is also analogous to the sealing-in process for the first group, the maximum temperature T$_{max}$ lying within the range of from 1650° C. 1750° C. Table III indicates data about filler material and T$_{max}$ for this third group of examples.

In addition to the filler materials Al$_2$O$_3$, UfO$_2$ and ZrO$_2$ used in the fist and second groups of examples, UO$_2$ is used, having 84% of the grains smaller than 4 μm and the specific surface area of 35 m$^2$/cm$^3$.

TABLE III

| serial nr. | filler material | quantity filler material in % by volume | I$_{max}$ in °C. |
|---|---|---|---|
| 19 | Al$_2$O$_3$ | 30 | 1650 |
| 20 | Al$_2$O$_3$ | 30 | 1675 |
| 21 | Al$_2$O$_3$ | 40 | 1700 |
| 22 | ZrO$_2$ | 20 | 1650 |
| 23 | ZrO$_2$ | 30 | 1675 |
| 24 | ZrO$_2$ | 40 | 1700 |
| 25 | HfO$_2$ | 20 | 1650 |
| 26 | HfO$_2$ | 30 | 1675 |
| 27 | HfO$_2$ | 40 | 1725 |
| 28 | UO$_2$ | 20 | 1675 |
| 29 | UO$_2$ | 30 | 1700 |
| 30 | UO$_2$ | 40 | 1750 |

The discharge vessels obtained were found to have a good gas-tight connection between the Nb sleeve and the disk, while the melting ceramic was found to be finely crystalline with finely divided filler material crystals. In most cases, the gap-shaped space between the PCA disk and the niobium sleeve was entirely filled with melting ceramic, which shows the favourable transporting properties of the melting ceramic During the sealing-in process of discharge vessels with the use of a melting ceramic with serial numbers 5, 8, 15, 17 and 18 from the tables, an increased viscosity of the relevant melting ceramic was found, which in a few cases resulted in only a partial filling of the gap-shaped space between the PCA disk and the niobium sleeve. However, thixotropic effects, such as demixing, were not found.

In some of the examples could a β aluminate crystal structure be found.

What is claimed is:

1. A composite body comprising a first part of ceramic material, a second part of material selected from the group consisting of metallic material, ceramic material and a mixture of metallic and ceramic material, and a third part of a melting ceramic which seals together the first and second parts, the melting ceramic comprising a glass frit of Al$_2$O$_3$ and either one or more alkaline earth metal oxides or one or more rare earth metal oxides or a combination of these two oxides, characterized in that melting ceramic contains a filler material which is distributed over its volume and occupies at least 20% and at most 50% of the volume of the melting ceramic.

2. A composite body as claimed in claim 1, characterized in that the filler material consists of one of more of the following metal oxides:
alumina
zirconium oxide
hafnium oxide
thorium oxide
uranium oxide.

3. A composite body as claimed in claim 2, characterized in that the filler material consists of HfO$_2$, which the quantity X satisfies the relation 20% by volume and occupies at most 40% of the volume of the melting ceramic.

* * * * *